INVENTORS
CALVIN R. WEAVER
GEORGE C. HEIL
ATTORNEY

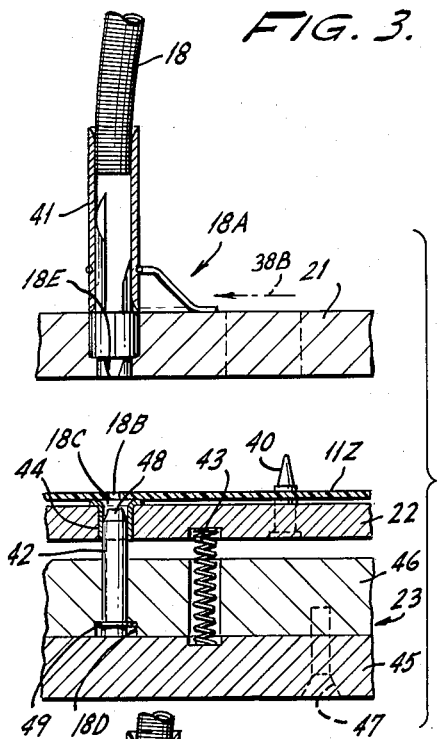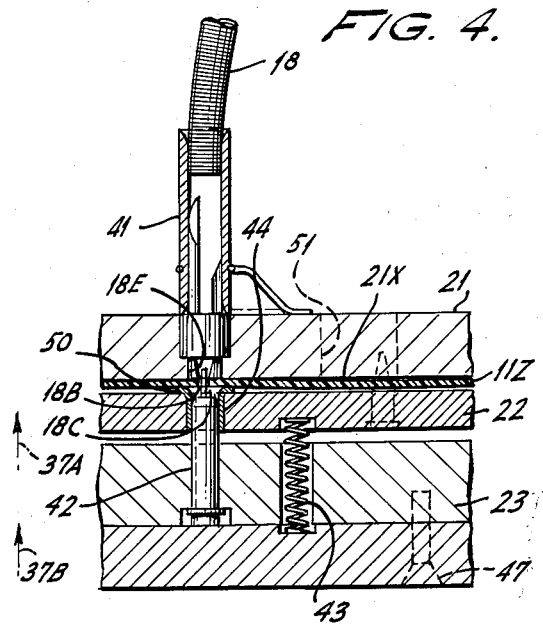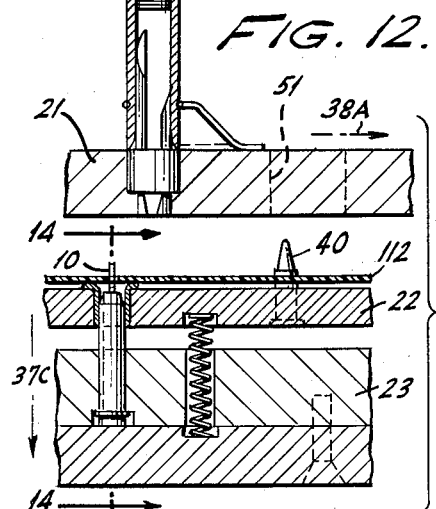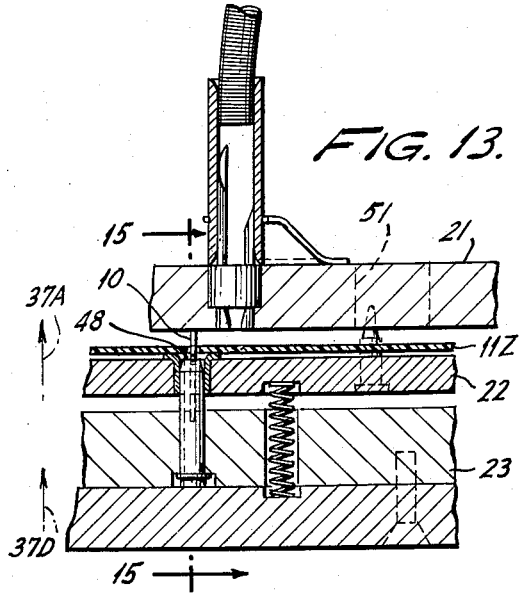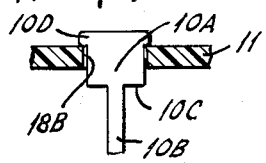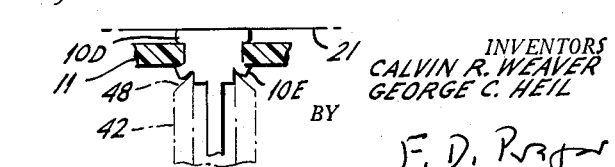

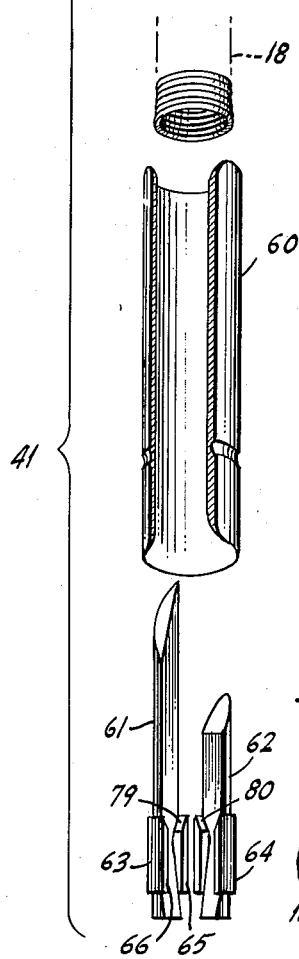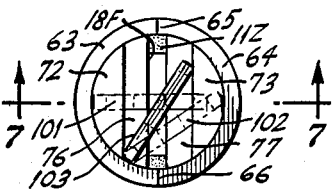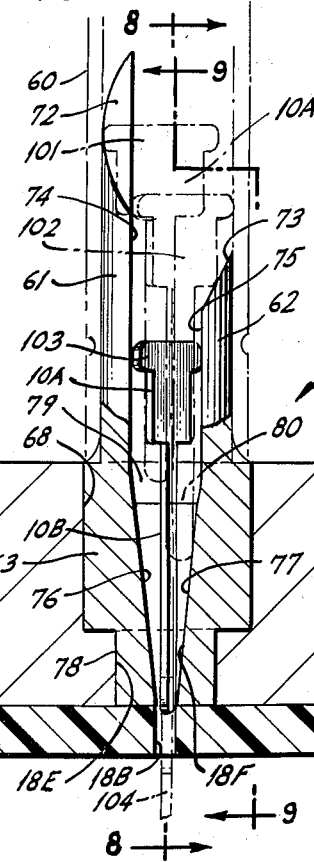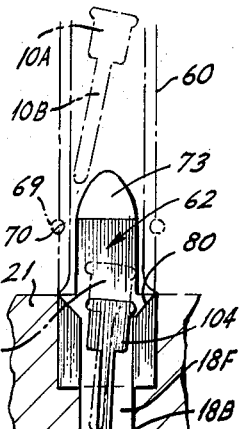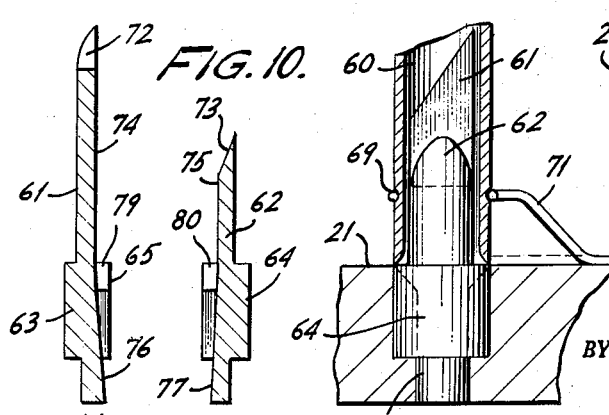

United States Patent Office 2,970,370
Patented Feb. 7, 1961

2,970,370

FABRICATION OF ELECTRICAL DEVICES

Calvin R. Weaver, Mount Ephraim, N.J., and George C. Heil, Morton, Pa., assignors to Philco Corporation, Philadelphia, Pa., a corporation of Pennsylvania Filed Nov. 19, 1957, Ser. No. 697,378

5 Claims. (Cl. 29—203)

This invention relates to the fabrication of circuit panels, such as are incorporated for instance in many types of electronic devices, and it provides apparatus for providing each panel with a system of so-called connector lugs, whereto interconnecting wires can subsequently be attached.

Heretofore, difficult problems were encountered when attempts were made to simultaneously provide each circuit panel with such an entire system of connector lugs. The lugs usually were supplied in the form of a coherent strip; so that they had identical forms, but at least some of them usually had some particular orientation on the panel. It is desirable to let the lugs reach their respective insertion areas by way of freely flexed guide tubes, through which they may fall; and this requires individual re-orientation of each lug even if all lugs are ultimately installed in parallel directions. Heretofore, when simultaneous severing of the lugs from a strip was to be followed by immediate, individual orienting, inserting and fastening of the different lugs, a number of difficulties were encountered. For instance, it happened at times that the machine failed to insert the required lug or lugs in one or several of the small insertion areas provided on a panel, thereby in each case substantially wasting the value represented by an entire circuit panel. In other cases, lugs were improperly inserted, causing breakage of panels and/or deformation of lugs upon the attempted fastening of the lugs. Complex and expensive tooling was used and yet considerable difficulties of the aforementioned types persisted, even when all or part of the chain of severing, feeding, orienting, inserting and fastening operations was conducted rather slowly. All this involved considerable fabricating cost, increasing the cost of electronic equipment.

It is a primary object of this invention to avoid such breakage and waste of panels and deformation of lugs, by improved anvil and hammer parts and associated means. Another important object is to avoid such failures of insertion, by means including improved, lug-orienting guides. Still another object of considerable significance is to provide a machine which installs a large system of lugs not only with safety but in a single operation of short duration, by the use of novel guides and tool members.

The exact way in which the objects have been achieved will best be explained in connection with the detailed description of a preferred embodiment of the new machine wherein:

Figure 3 is a more enlarged view, forming a sectional elevation taken along line 3—3 in Figure 2 and showing certain parts in a first operative position thereof. Figure 4 is a similar sectional elevation, showing the same parts in a second operative position.

Figure 5 is a perspective, exploded view, on an additionally enlarged scale, of a subcombination of elements from Figures 3 and 4. Figure 6 is a still more enlarged plan view of said subcombination. Figure 7 is a front elevation, partly in section, showing some of the component parts of the subcombination of Figure 6, in combination with other parts. Figure 8 is a section taken along line 8—8 in Figure 7, on the scale of Figure 5. Figure 9 is a section taken along line 9—9 in Figure 7, on the scale of Figures 5 and 8. Figures 10 and 11 are sections of certain elements, taken along lines 10—10 in Figure 6.

Figures 12 and 13 are views generally similar to Figures 3 and 4 but which respectively show the parts in a third and a fourth operative position. Figure 14 is a fragmentary and additionally enlarged section, taken along line 14—14 in Figure 12. Figure 15 is a similar section, taken along line 15—15 in Figure 13.

Figure 1:
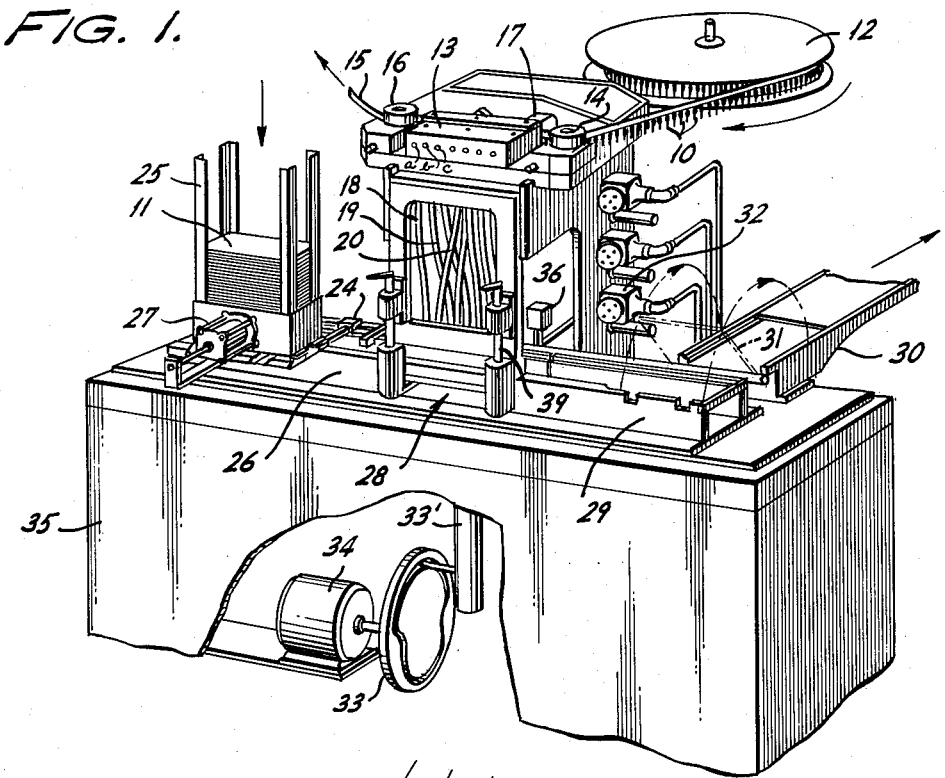
Figure 1 is a perspective view of the preferred embodiment.

Referring initially to Figure 1: the machine serves to insert a number of connector lugs 10 in each of a succession of circuit panels 11. The lugs are desirably formed from flat metal stock, while the panels may be formed from flat, synthetic plastic sheeting. Either some or all of the electrical connections to or between components installed on each panel are effected by lugs 10, so that the panels may or may not comprise extensive systems of printed or etched circuit paths or the like. The connection of circuitry to the lugs may be effected for instance in the way described by A. V. Nichol in application Serial No. 584,234, filed May 11, 1956 and entitled, Wiring Apparatus, which is assigned to the assignee of the present invention.

Prior to the insertion of lugs, a strip of the lugs 10 may be stored on a reel 12, the lugs being interconnected; for instance the lugs may initially be bonded to one another or partly punched out of an integral strip. A cutting or breaking or similar mechanism 13, equipped as shown with a plurality of anvils at positions such as those identified as a, b, c, etc., is provided for simultaneously severing a predetermined number of lugs 10 from the strip and for also separating them from one another. The strip may be guided into the mechanism 13, over a roll 14, and any spent strip material 15 may leave the mechanism over a second roll 16. For the said severing of the lugs, the mechanism 13 may be actuated by a pneumatic device 17, connected with a suitable source of compressed air or the like, not shown.

Figure 2:
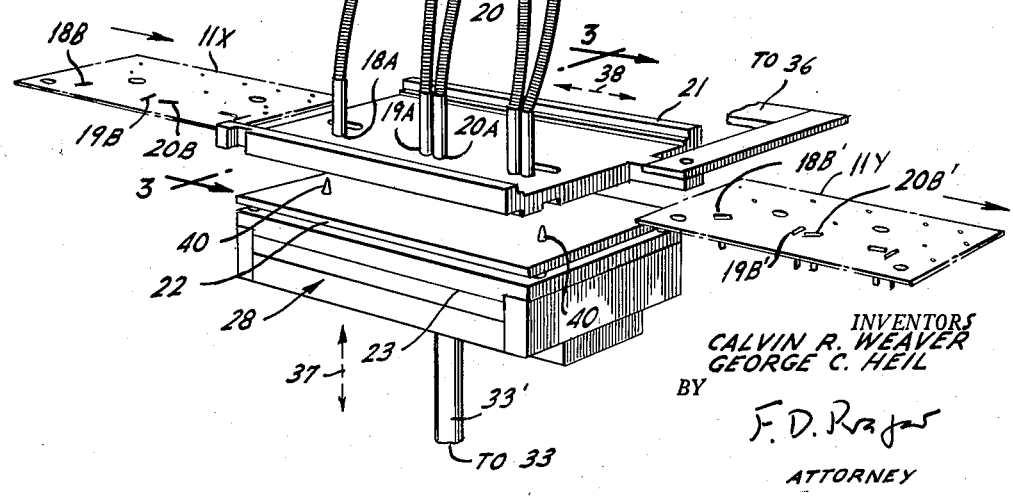
Figure 2 is a similar, slightly enlarged view of certain principal parts of the same machine, isolated from the other parts thereof.

Downwardly extending from each anvil a, b, c, etc. in the mechanism 13 is a flexible guide tube 18, 19, 20, etc., and each of said tubes, as best shown in Figure 2, leads to a predetermined insertion area 18A, 19A, 20A, etc. on a rigid but movable, horizontal plate 21 in a lower part of the machine, said areas being indexed with narrow, elongated holes 18B, 19B, 20B, etc., provided for the insertion of lugs on each panel 11, as shown on panel 11X at the left end of Figure 2. The machine serves to simultaneously feed one severed lug 10, through the guide system 18, 19, 20, 18A, 19A, 20A, etc., to each position 18B, 19B, 20B, etc. on each successive panel 11Y, 11X, etc.; and it also serves the object, among others, of properly orienting and inserting each lug. Accordingly it will be noted, at the right hand of the figure, that all required lugs 10 have been oriented on and inserted in a panel 11Y, about to leave the machine, as shown at 18B', 19B', 20B', etc. The different points of placement and ways of orientation of the lugs are, of course, arranged so as to facilitate an effective and compact arrangement of the electrical circuitry provided on the panel.

While simultaneous insertion operations of the type thus far described have been known and performed heretofore, they have been facilitated to a great extent by certain features of the present invention, and particularly by the mechanism which includes the aforementioned plate 21 and which may be designated as an expandable shuttle plate. This mechanism also comprises second and third rigid plates 22, 23. The three plates 21, 22, 23 are substantially coextensive in area and normally disposed vertically above one another, subject to certain horizontal movements of the uppermost plate 21 relative to the lower plates 22, 23 and also subject to certain vertical movements of the lower plates relative to the upper one and to one another.

Individual panels 11, in suitable succession, are transferred to and temporarily held in the space between the uppermost and intermediate plates 21, 22, by a suitable mechanism which may for instance comprise pneumatic means, as generally indicated at 24 in Figure 1. The panel transfer may lead from a chute 25, wherein a stack of panels is held, along a horizontal panel guide track unit 26, into the said space between plates 21, 22; each individual panel to be transferred being separated from the stack by further pneumatic means 27. The track for the transfer of panels may then continue from the insertion area 28 containing the expandable shuttle plate mechanim 21, 22, 23; for instance, there may be provided guide unit 29, in line with the units 26, 28; and, as indicated in purely schematic form, there may be an exit guide 30, desirably equipped with automatic transfer means 31, actuated at 32, for moving panels from transfer guide 29 to exit guide 30.

The shuttle plate mechanism 21, 22, 23 (Figure 2) in the work area 28 (Figure 1) may have lower parts 22, 23 thereof raised and lowered by a cam and follower mechanism 33, 33' driven by a motor 34 in a base structure 35 and an upper part 21 of said mechanism may be shuttled or reciprocated horizontally by suitable linkage, driven by pneumatic means 36. The vertical motions are diagrammatically indicated by the double arrow 37 (Figure 2) and the horizontal motions, by the double arrow 38. The uppermost plate 21 performs the horizontal shuttling subject to suitable guidance by the guide mechanism 26, 29 in the insertion area 28 (Figure 1), whereas vertical guidance, for the lower and intermediate plates 22, 23, may be provided by vertical track means 39. The successive motions may be timed or programmed by suitable controls not shown.

Reference will now be made to Figure 3 for a more detailed explanation of certain important parts provided for the guidance and orientation of lugs to be inserted acording to this invention. The figure shows a small portion of the shuttle plate mechanism 21, 22, 23, with the lower plates 22, 23 disposed in what may be identified as their normal, lowermost position, wherein both of them are relatively widely spaced from the top plate 21 and from one another; and said top plate is shown in what may be called its normal, left-hand position. Apertures 18C, 18D, formed in the two lower plates, respectively, are registered with, that is, coaxially located below one another and below an opening 18E; this latter opening forming part of the insertion area 18A in the upper plate 21. Also, a panel 11Z has been inserted in the shuttle plate mechanism so as to align its insertion hole 18B with the lower plate apertures 18C, 18D. A pin mechanism 40, shown in Figures 2 and 3, firmly holds the panel on the intermediate plate 22, to maintain the mutual alignment of the panel apertures 18B with the plate apertures 18C, 18D.

As generally shown in Figure 3, a top plate aperture 18E has a lug orienting mechanism 41 installed therein and connected with the lower end of the corresponding tube 10, in order to make sure that the lugs 10, which are originally oriented in parallel with one another while on the strip (Figure 1) and which may fall through the tube 18 in random orientations, will ultimately be oriented so that the lug when being inserted at 18B' (Figure 2), matches the angular orientation of the corresponding insertion hole 18B. This is required for proper insertion of the lug, which otherwise will not enter the narrow, elongated insertion hole 18B.

Below each orienting mechanism 41 (Figure 3) the shuttle plate device comprises a punch and hammer member 42, shown as a tube inserted in the aperture 18D of the lowermost plate 23, for instance by force-fitting. The punch and hammer element extends upwardly into the intermediate plate, which serves as guide, and toward the top plate 21, which serves as an anvil. Spring members 43 are used to resiliently interconnect the intermediate or guide plate 23 with the lowermost or hammer actuating plate 22; and the punch and hammer members 42 are slidable in the guide plate 22, for instance in bushings 44 force-fitted into said plate.

While the intermediate plate 22 acts as a guide, holding the free top ends of all punches 42 at locations accurately indexed with areas 18A of top plate 21, the said punches also act as guides serving to index the lowermost apertures 18D with the intermediate apertures 18C. Thus a rigidly indexed although vertically and horizontally mobile combination of three sets of apertures 18E . . . , 18C . . . and 18D . . . is provided. Any tendency toward downward displacement of a punch 42, incident to its punching action, may be prevented, for instance by providing an abutment surface on the lower end of the punch member, bearing against the top of a bottom portion 45 of the actuating plate 23, said bottom portion being held to an upper portion 46 of the same plate by fastening means 47. Upward displacement of the punch member 42, which might be caused by vibration or by frictional forces applied to the cutting edge 48 of the punch, can be prevented for instance by a snap ring 49 on the punch 42, engaging a suitable shoulder in the aperture 18D.

Reference to Figure 4, and comparison thereof with Figure 3, will show that, pursuant to an upward stroke 37A of the intermediate and lower plates 22, 23, the panel 11Z has been contacted with the underside of the top plate 21; and a further upward stroke 37B of the lower plate 23 has resiliently compressed springs 43 so as to press the intermediate plate and thereby the panel against the top plate. This is achieved by the use of a suitably configured cam 33, Figure 1. Thus the apertures 18E, 18B, 18C of top plate, panel and intermediate plate are now continuous with one another, forming in effect a single insertion hole. Even in the event that the panel 11Z is slightly warped, which is hard to avoid in practice, the placement of each panel aperture 18B in such direct continuity with the corresponding upper and lower plate apertures 18E, 18C is insured by an arrangement according to which every bushing 44, surrounding the lower aperture 18C, may have for instance an annular lip 50, slightly spacing the panel 11Z from the top of intermediate plate 22 and compressing it between the upper and lower plates, so that the warped configuration of panel 11Z causes lack of plate-panel contact exclusively in areas 21X remote from the insertion holes. By means of this feature it is possible to achieve safe insertion of lugs, while allowing a certain amount of randomness or lack of precise verticality, as to the orientations of the lugs relative to vertical planes, at the point and moment of insertion. This, in turn, allows successful insertion of rapidly falling lugs, which are not appreciably slowed up, in their downward progress, by attempts to apply any major orienting forces thereto in planes other than the horizontal.

Horizontal orientation of the rapidly falling lug is achieved by the construction of tool 41 which will best be understood from a consideration of Figures 5 to 11. This construction comprises a generally cylindrical sleeve 60, a sliced-off portion of which is shown in Figure 5 and the top of which has suitable fit with the lower end of the flexible supply tube 18. A pair of lug guiding members 61, 62 are fitted into the lower portion of the sleeve. These guiding members are individual metal bodies, having relatively thick lower portions 63, 64.

The said lower portions, as best shown in Figure 6, abut against one another along short, radial surfaces 65, 66, so that portions 63, 64 jointly form a small, partially hollowed-out cylinder; and this cylinder, as shown in Figure 7, is held assembled and mounted by fitting it into a bore 68, forming an upper portion of the insertion hole 18E in the top plate 21. By means of such mounting, both metal pieces 61, 62 are rigidly connected with the metal of the plate 21 so that they extend upwardly therefrom like a pair of small poles, separated from one another by a suitable insertion space 18F of narrow and elongated form in a horizontal plane, Figure 6, and of downwardly tapering form in a vertical plane, Figure 7.

The outside surfaces of said small poles are rounded so that the bottom portion of cylindrical sleeve 60 can be fitted over the same, Figures 7, 8. Desirably, upward displacement of the sleeve, by vibration or the like, is prevented by a snap ring 69, held in a groove 70 on the lower outside of the sleeve 60, Figures 8 and 9; an extension 71 of said ring being suitably held to the top of plate 21.

An important feature of the invention is the peculiar configuration of the exposed surfaces, presented by the guide members 61, 62 within the sleeve 60 and shuttle plate 21 (Figure 7). These surfaces include: a top surface 72 of the first and relatively tall guide member 61, inclined in such a direction that a small object falling thereon is deflected tangentially of the cylindrical sleeve 60, to be guided in a circular path by the inside surface of said sleeve, thereby tending to produce, for instance, successive lug positions 101, 102 in Figures 6 and 7; a top surface 73 of the shorter guide member 62, preferably inclined in a direction at right angles to the direction of inclination of surface 72, for radial inward deflection of a small object falling onto this latter surface 73; vertical inside surfaces 74, 75 on the members 61, 62, intersecting the top surfaces 72, 73, these vertical surfaces facing one another and being spaced apart by a distance only slightly smaller than the width of the foot portion 10A of a lug to be inserted, but substantially greater than the thickness of the lug; and lowermost surfaces 76, 77, similarly facing one another but gradually approaching one another, to form the narrow, elongated, downwardly tapering insertion hole 18F in the bottom part 78 of the guide mechanism, which hole is just sufficient to pass the lug 10.

It will be noted that the lug insertion tool 41 (Figure 5) can be made from fairly simple, inexpensive parts 60, 61, 62 and that rapid and safe insertion of lugs, in predetermined orientation, is nevertheless achieved. The fabrication of the tool elements 61, 62 (Figures 10, 11) includes only two somewhat special operations; first, the milling, grinding or other machining or forming of the vertical and inclined surfaces 74, 75 and 76, 77, and, second, as a further, preferred feature, the forming of inwardly inclined surfaces 79, 80 on the top of the abutment members 63, 64, for preventing interception of the free fall of lugs 10 by the said abutment members.

The process of inserting lugs according to this invention begins by transferring a panel 11 from chute 25 into insertion area 28, Figure 1, while the shuttle plate mechanism, Figure 2, is in the first or panel-insertion position, Figure 3. There follows the punching out of a predetermined number of lugs 10—one for each insertion hole 18A, 19A, etc.—from the strip of lugs by mechanism 13, 17, Figure 1, when the plate mechanism has been brought into the second or lug insertion position, Figure 4. The lugs then tumble through the flexible tubes 18 etc. and the upper parts of the sleeves 60, in random orientations, except that their foot portions 10A extend downwardly from their top and body portions 10B, this general arrangement being maintained during their fall, as the body portions 10B are substantially longer than the tube 18 is wide, see Figure 7.

The first positive, orienting step occurs if and when a leading end or portion of a lug 10—the tip of body 10B, Figure 8— contacts either top surface 72 or 73. Either the surface 72 together with the inside of sleeve 60, or the surface 73 by itself then rapidly guides the said tip portion into the downwardly tapering insertion space 18F between the vertical surfaces 74, 75. Next, either a first and leading shoulder 10C or a second shoulder 10D on the foot portion 10A (see Figure 14) hits the upper or lower inclined surface 72 or 73, except if the entire lug is already in proper orientation. Normally the orientation of the lug is then improved, with rotation between positions such as 101, 102, Figure 6, if the action occurs at the upper deflecting surface 72; and almost perfect orienting, by rotation between positions such as 102, 103, ensues if the action occurs at the lower deflecting surface 73. The lug 10 is then finally oriented in accordance with apertures 18B, both angularly and linearly, by sliding contact of any of the edges of foot portion 10A with one or more of the inclined surfaces 79, 80 and the further inclined surfaces 76, 77, as may best be appreciated when considering Figures 7 and 8 and visualizing the fall of the lug from position 103 to 104.

Thus it will be seen that the lug 10 is allowed to tumble and bounce through the insertion mechanism with a minimum of interference but with a few successive impacts leading it smoothly and rapidly into a position exactly matching that of the insertion hole 18B, Figure 7. The lug is finally stopped at the point where the second and widest shoulders 10D thereon (Figure 14), contact the top surfaces of the panel 11Z which project slightly into the slot 18F, see Figure 6. Of course the passage of the lug into and through the final and relatively narrow passage 18F may be accelerated, for instance, by well-known vibrator means not shown.

The so-inserted lug can then be fastened to the panel without danger of loss or breakage. For instance, no properly designed and inserted lug will accidentally come to rest on the panel at 10C rather than 10D.

The fastening operation begins, as shown in Figure 12, with a downward return stroke 37C of the lower and intermediate plates 22, 23 and panel 11Z. Then follows the lateral, rightward shuttling 38A of the top plate 21.

The ensuing anvil and hammer operation, also known as staking, is illustrated by Figure 13. Here the combined, lower and intermediate plates and the panel, with the lug therein, have been raised by a second upward stroke 37A, to contact the upwardly exposed edge of the lug with a solid portion of the bottom surface of the top or anvil plate 21. Additionally, there is then executed a final upward stroke 37D, similar to the stroke 37B, Figure 4, except that now the cutting edges 48 cut into the lug shoulders 10C, as shown in Figures 14 and 15, for the purpose of punching and hammering portions 10E of the lug to laterally bend the same, as a pair of crimped arms, against the underside of the panel 11, while the upper shoulders 10D, abutting against plate 21, bear against the top surface of said panel.

Upon a further and final, downward stroke 37C, the panel is dislodged from the lower plate means by well known apparatus, not shown, and transferred out of the insertion area.

The shuttle mechanism is able to assume the successive positions as described, without interference by devices such as the panel holding pins 40; for reception of these latter pins, for instance, elongated slots 51 may be formed in the underside of the top plate 21, providing room for the top portions of said pins in the position of Figure 4 and also in that of Figure 13.

The operation of the machine has been described hereinabove so that it is believed to require no further statement at this point. It may be well, however, to explain the way in which problems of former machines for similar purposes have been overcome.

As indicated in the introductory part of this description, it was not uncommon in such prior machines that some of the required lugs failed to be inserted properly on some of the panels. For instance it happened that insertion at some particular areas such as 19B, Figure 2, failed in a certain percentage of the panels, for instance in that some or all of the lugs guided to such areas failed to reach the position of Figure 14, when the machine was in the position of Figure 4, in which case the lugs frequently fell out of the panel insertion holes 19B when the machine moved into the position of Figure 12. A number of reasons were involved in this particular difficulty, prominently including a failure of the earlier machines to form truly continuous apertures 18E, 18B, 18C, as shown in and explained with respect to Figure 4.

Sometimes, in prior machines, the failure of insertion of lugs was only partial and the lug came to rest on the top of the panel with the lower shoulders 10C instead of the upper shoulders 10D. Where such was the result of the position of Figure 4, the lug was not entirely lost, as a rule, in the position of Figure 12; but there ensued, in the position of Figure 13, either breakage of the panel or breakage of the lug and in both cases, as well as in the case of complete failure of insertion, the entire panel was wasted. The improper seating mentioned was sometimes caused by the insertion guides rather than the panel holding mechanism. In particular the lug insertion guide of prior constructions frequently required longer periods of downward travel of the lug than were actually provided, so that premature starting of certain motions resulted in said incomplete insertion and consequent breakage.

On the other hand, when the lug insertion cycle was made slow enough to suit the insertion guides of the earlier machines, the result then was that only a limited number of panels could be treated on the machine during each working hour or day, thereby frequently necessitating the acquisition of extra machines and corresponding extra cost.

The foregoing difficulties, among others, have been overcome entirely by the machine disclosed herein, whereby substantial savings in the production of circuit panels and of electronic equipment containing the same have been achieved. A great variety of types of circuit panels, as used for instance in television receivers for either black and white or color reception, have been produced on machines built and operated in accordance with the present invention and in all of said cases the percentage of failures of lug insertion or of faulty lug insertion or breakage was substantially nil, whereas the speed of operation was substantially greater than in the case of the prior machines.

While only a single embodiment of the invention has been described, it should be understood that the details thereof are not to be construed as limitative of the invention, except insofar as is consistent with the scope of the following claims.

We claim:

1. In apparatus for mounting electrical components, such as connector lugs, in apertures of circuit panels, a plate system consisting of three horizontal plate units, generally overlying one another and comprising: an upper plate, horizontally movable to slightly different positions, said plate having insertion ports vertically extending through the plate and located in a pattern similar to that of the panel apertures; an intermediate, vertically movable plate, having alignment ports vertically extending through the latter plate and located in a pattern similar to that of the panel apertures, said intermediate plate having means for receiving and holding one of said panels with the panel apertures and the plate alignment ports in registry so that in an insertion position of the plate system, with the intermediate plate raised and the upper plate in one of its positions, registered and continuous apertures extend through the upper plate, the panel and the intermediate plate for insertion of components into positions extending from said insertion ports, through the panel, into said alignment ports; a lower, vertically movable plate having punch elements secured thereto, upstanding therefrom and vertically slidable in the alignment ports of the intermediate plate, for staking engagement with the undersides of components inserted in the panel; means for effecting cycles of horizontal reciprocating motions of said upper plate to said different positions and coordinated vertical reciprocating motions of said lower and intermediate plates, each cycle including initial upward motion of the lower and intermediate plates, with a panel thereon, to establish said insertion position, subsequent downward motion of the lower and intermediate plates with the panel and inserted components, followed by horizontal motion of the upper plate to register the components, and the punch elements for staking them, with unported areas of the upper plate adapted to bear against the components, and renewed upward motion of the intermediate and lower plates, with the panel and inserted components, for said staking engagement; and flexible connector means, enabling and forcing the punch elements on the lower plate upwardly to override the intermediate plate, toward the panel, in the establishment of said staking engagement.

2. Apparatus as described in claim 1, wherein the last mentioned connector means includes resilient means bearing against upper surfaces of the lower plate and against lower surfaces of the intermediate plate, so as to yieldingly, vertically spread said two plates apart, whereby the means for effecting coordinated vertical motions is adapted to effect all of the vertical motions in the plate system, including the initial and renewed upward motions and said upward overriding, by means of linkage manipulating the lower plate.

3. Apparatus as described in claim 1 additionally including a lug feeder above the plate system and a series of flexible lug guides, all leading downwardly from the lug feeder and each leading to one of the insertion ports.

4. Apparatus for mounting electrical wire connector lugs on circuit panels, comprising: a lower, vertically movable plate unit, including first and second horizontal plates, the first overlying the second; an upper, horizontal plate, generally overlying the lower plate unit, horizontally movable to and between two different positions and having lug insertion ports vertically extending through the upper plate and adapted to be registered with lug insertion holes in the panels for insertion of lugs, through said ports, into said holes; said first plate of the lower plate unit having vertically extending alignment ports and being arranged to receive one of said panels on said first plate, with the panel holes and alignment holes in registry; said second plate having punch elements secured thereto, upstanding therefrom and vertically slidable in the alignment ports of the intermediate plate, for staking engagement with the undersides of lugs, inserted in the corresponding panel holes; means in said lower plate unit for resiliently supporting the first plate thereof from the second plate thereof; and means effecting successive, horizontal motions of said upper plate to said different positions and effecting upward and downward motions of said second plate after each of said horizontal motions, whereby one of the motions of the second plate adapts the apparatus to said insertion of lugs and the next of said upward motions of the second plate, with the punch elements thereon, effects staking of the inserted lugs to the panel.

5. Apparatus as described in claim 4, additionally including flexible lug insertion guides, extending from the insertion ports of the upper plate to an overlying, stationary lug feeder device, and, in each of said guides, a pair of lug orienting posts, mounted in and upstanding from the insertion port, said posts having top surfaces disposed one above the other and inclined in planes intersecting one another, while said ports have horizontally spaced side surfaces facing one another.

References Cited in the file of this patent

UNITED STATES PATENTS

| | | |
|---|---|---|
| 2,408,882 | Robbins | Oct. 8, 1946 |
| 2,526,717 | Weisberg | Oct. 24, 1950 |
| 2,604,692 | Broden | July 29, 1952 |
| 2,613,861 | Goerlitz | Oct. 14, 1952 |
| 2,621,824 | Gookin | Dec. 16, 1952 |
| 2,672,837 | Maher | Mar. 23, 1954 |
| 2,768,429 | Willis | Oct. 30, 1956 |
| 2,772,416 | Dorosz | Dec. 4, 1956 |
| 2,843,923 | MacKenzie | July 22, 1958 |
| 2,850,737 | Walsh | Sept. 9, 1958 |